May 31, 1966    C. E. SCHEFFLER    3,253,781
CHOKE VALVE CONTROL
Filed March 31, 1964
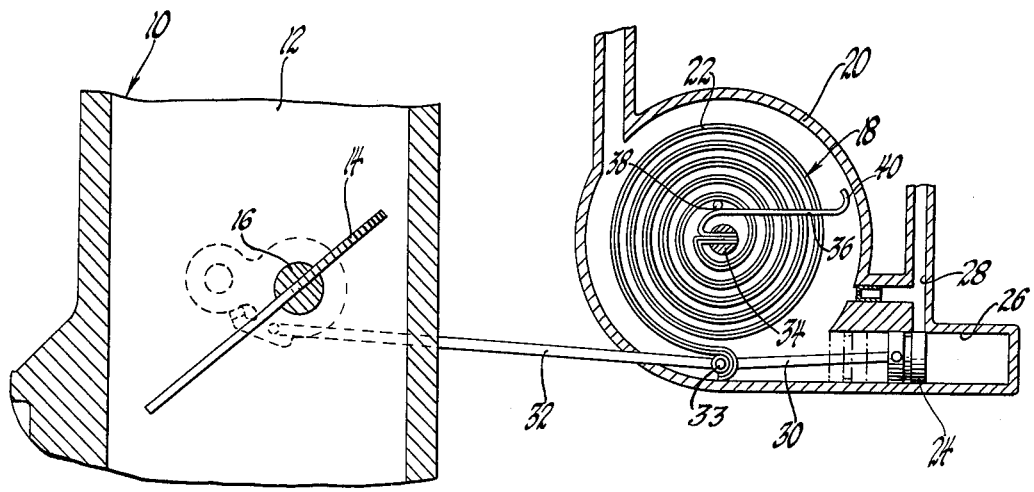
INVENTOR.
Charles E. Scheffler
BY
J. L. Carpenter
ATTORNEY United States Patent Office 3,253,781
Patented May 31, 1966

3,253,781
CHOKE VALVE CONTROL
Charles E. Scheffler, Detroit, Mich., assignor to General Motors Corporation, Detroit, Mich., a corporation of Delaware
Filed Mar. 31, 1964, Ser. No. 356,174
2 Claims. (Cl. 236—92)

This invention relates to chokes for internal combustion engines and more particularly to a choke valve control.

Carburetors conventionally include a choke valve for limiting the amount of air entering the carburetor under starting and cold operating conditions so that a rich mixture is supplied to the engine. The position of the choke valve is often controlled by an automatic choke which includes a piston responsive to manifold vacuum and a bimetallic thermostat responsive to engine temperature. The thermostat biases the choke valve to closed position under starting and cold operating conditions while the piston partially opens the choke valve as the engine starts to avoid flooding and subsequent stalling. As the engine warms up to normal operating temperature, the thermostat gradually moves the choke valve to open position.

This arrangement works well under most cold engine starting conditions unless the ambient temperature is very low, such as below —20° F. Under such low temperatures, the biasing force of the thermostat is too strong to be overcome by the piston and, accordingly, the choke valve stays closed as the engine starts so that the engine floods and stalls.

The choke valve control of this invention overcomes this disadvantage of such automatic chokes by limiting the biasing force of the thermostat so that the manifold vacuum operated piston always functions as the engine starts regardless of the ambient temperature.

One of the features of this invention is that it provides a choke valve control for an internal combustion engine fuel system. Another feature of this invention is that the choke valve control includes a thermostat responsive to ambient temperature, a piston responsive to engine manifold vacuum, and means limiting the biasing force of the thermostat to a predetermined degree regardless of ambient temperature.

The drawing is a partially broken away view of a carburetor embodying a choke valve control according to this invention.

Referring now to the drawing, a carburetor designated generally 10 includes an air inlet or induction passage 12. A choke valve 14 is rotatably mounted within passage 12 by a shaft 16 and controls the amount of air entering the carburetor. Shaft 16 is rotated by an automatic choke designated generally 18 which is located within a housing 20 and includes a bimetallic thermostat 22 and an engine vacuum operated piston 24.

When the engine is cold, the thermostat 22 acts to rotate the shaft 16 in a direction to close the choke valve 14 so that a rich mixture is supplied to the engine. When the engine starts, even under cold operating conditions, the choke valve 14 should be partially open to permit ambient air to enter the carburetor and thereby prevent flooding. The choke valve is moved to a partially open position against the force of the thermostat 22 by the piston 24 which is slidably mounted in a cylinder 26. When the engine starts, under cold operating conditions, manifold vacuum applied to the cylinder 26, through the passage 28, moves the piston 24 to the right, as viewed in the drawing, from its dot-dash position to its full-line position. The piston 24 closes the opening of the passage 28 to the cylinder 26 in its full-line position. Pivotally interconnected links 30 and 32 connect the piston 24 to the shaft 16 in a conventional manner so that movement of the piston 24 to the right moves the valve 14 from a fully closed position, not shown, to a partially open position, as shown..

The outer end of the thermostat 22 is hooked to the bushed pivot 33 between the links 30 and 32 and the inner end of the thermostat is secured to a shaft or pin 34 which is rotatably supported within the housing 20. Also secured to the pin 34 is one end of a constant rate cumulative force flat spring 36 which extends to the right of the pin 34 and adjacent the secured end thereof bears against a pin 38 fixed to the housing 20. Under cold operating conditions and when the engine is not running, the force of the thermostat biases the links 30 and 32 to the left, as viewed in the drawing, to bias valve 14 to closed position. Piston 24 will be located in its dot-dash position when the choke valve 14 is closed.

Under extremely cold operating conditions, such as below —20° F., the biasing force of the thermostat 22 is sufficiently great so that the application of engine vacuum to the cylinder 26 upon engine starting fails to move the piston 24 to the right to partially open the valve 14. The valve 14 thus stays closed and the engine subsequently floods and stalls.

This disadvantage is overcome by the choke control spring 36 of this invention which limits the biasing force of the thermostat 22 to a predetermined degree so that the piston 24 is always able to move to the right within the cylinder 26 to partially open the choke valve regardless of the ambient temperature.

The bimetallic thermostat 22 has the metal with the greater coefficient of thermal expansion on the outside of the coil. Thus, when the temperature is lowered, the coil tends to unwind and the outer hooked end tends to move clockwise, as viewed in the drawing, moving links 30 and 32 to the left and closing the choke valve. The inner end of the coil tends to move counterclockwise and wind the spring 36 about the rotatable pin 34. The spring constant of this spring is great enough to resist the force exerted by the thermostat and prevent rotation of the pin 34 when the temperature is above a predetermined value, such as 30° F. Above this predetermined temperature value, the piston, under the influence of engine vacuum, is easily able to overcome the force exerted by the thermostat and open the coke valve when the engine starts as previously described.

At temperatures below 30° F. the force of the thermostat tending to rotate pin 34 counterclockwise is greater than the force exerted by the constant rate spring tending to prevent this rotation. Thus, the pin 34 rotates in a counterclockwise direction and winds the constant rate spring about this pin. When the engine starts, the piston then does not have to overcome the full force of the thermostat and is able to open the choke valve since it need only rotate the pin in a counterclockwise direction and wind the constant rate spring farther about the pin 34. Thus, it can be seen that the piston can open the choke valve with a force no greater than that needed to deflect the constant rate spring. The spring is designed to be long enough so that the hook 40 would normally not contact the post 38 and prevent further rotation of the pin 34. Thus, the piston can continue to function even at very low temperatures, such as below —20° F.

Thus, this invention provides an improved choke valve control.

I claim:
1. In a fuel system for supplying a mixture of air and fuel to an internal combustion engine, means for varying the air-fuel ratio of the mixture comprising a choke controlling air flow to the engine, a support housing, a shaft member rotatably mounted in said housing, a coiled bimetallic thermostat having one end thereof secured to said shaft member and the other end thereof operatively connected to said choke, a pin secured in said housing and extending parallel to and adjacent said shaft member, a cumulative force spring having one end secured to said shaft member and positioned by said shaft member to contact said pin, the force exerted by said spring upon said shaft member opposing the force exerted by said thermostat whereby said thermostat exerts a closing bias on said choke to reduce the air-fuel ratio in response to a decrease in temperature, said choke being adapted to open in opposition to the bias exerted by said thermostat in response to a predetermined increase in engine vacuum to thereby increase the air-fuel ratio, said shaft member rotating to cause sliding contact of said spring against said pin and coil said spring to increase the force of said spring opposing the force of said thermostat and limit the closing bias exerted by said thermostat on said choke whereby a predetermined increase in engine vacuum will cause said choke to overcome the closing bias of said thermostat and increase the air-fuel ratio after starting the engine.

2. The fuel system of claim 1 wherein the other end of said spring includes a hooked portion adapted to engage said pin to prevent a loss of contact of said spring with said pin as said spring is coiled.

References Cited by the Examiner
UNITED STATES PATENTS

| | | | |
|---|---|---|---|
| 1,000,435 | 8/1911 | Pagelsen | 236—34.5 |
| 1,991,392 | 2/1935 | Jorgensen et al. | 236—34 |
| 2,479,392 | 8/1949 | Miller | 236—92 |
| 2,998,233 | 8/1961 | Marsee. | |
| 3,047,280 | 7/1962 | Pernetta. | |

ALDEN D. STEWART, *Primary Examiner.*